United States Patent [19]
Juarbe

[11] 3,792,883
[45] Feb. 19, 1974

[54] VEHICLE LOCK PROTECTOR

[76] Inventor: Puro De Jesus Juarbe, P.O. Box 582, Riverdale, Md. 20840

[22] Filed: Apr. 13, 1972

[21] Appl. No.: 243,657

[52] U.S. Cl. ................................................ 292/1
[51] Int. Cl. ......................... E05b 1/04, E05c 21/00
[58] Field of Search .......... 292/146, 288, 1, DIG. 23, 292/DIG. 37, 67; 135/5 R, 5 E; 200/42 R, 42 T, 42 A; 70/181, 185

[56] References Cited
UNITED STATES PATENTS

| | | | |
|---|---|---|---|
| 3,414,306 | 12/1968 | Bernstein | 292/1 |
| 3,501,187 | 3/1970 | Saksa et al. | 292/1 |
| 2,793,064 | 5/1957 | Budoff | 292/1 X |
| 3,247,691 | 4/1966 | Martin | 70/181 |
| 3,109,900 | 11/1963 | Van Hook | 200/42 R |
| 3,606,421 | 9/1971 | Reichenbach | 292/1 |
| 3,502,369 | 3/1970 | Trammell | 292/288 X |
| 3,527,914 | 9/1970 | Spacek | 200/42 T |
| 3,082,028 | 3/1963 | Werle | 292/1 |

Primary Examiner—Geo. V. Larkin

[57] ABSTRACT

A motor vehicle lock protector device enclosing the push button associated with a vehicle door lock in such manner as to prevent tampering therewith to provide security against vehicle theft and manipulation by children riding in the vehicle. The device is mounted on the vehicle door frame and positioned over the push button. The device may define an opening on the side facing the interior of the vehicle to provide access to the push button from the interior of the vehicle, or a door may be used to close the opening to provide the child safety feature. A latch requiring strength normally inherent in adults but not in children may be used to maintain the door of the protector device in secured closed position to further enhance the child safety feature. The latch is located so as to be more accessible to the driver relative to passengers such as children that may be riding within the vehicle.

3 Claims, 4 Drawing Figures

PATENTED FEB 19 1974 3,792,883

VEHICLE LOCK PROTECTOR

BACKGROUND OF THE INVENTION

1. Field of the Invention

The invention relates to a motor vehicle lock protector positioned over a door lock to prevent tampering therewith, to provide security against car theft and make it difficult for children to unlock the door from within the vehicle.

2. Description of the Prior Art

The prior art discloses devices to protect against theft of motor vehicles by tampering with the door lock. Attention is directed to Saksa et al. U.S. Pat. No. 3,501,187 which discloses a collapsible device that fully covers the lock button but does not prevent its activation from within. The device is composed of a resilient material such as rubber or plastic and this is an important feature of the invention because it is disclosed as thwarting unauthorized attempts to gain access. Reichenbach U.S. Pat. No. 3,606,421 discloses a removable antipilfering device which does not permit ready accessibility to the door lock button by authorized persons and which, moreover, is cumbersome because it is attached to the door frame both at the top and bottom of the window. Both Saksa et al. and Reichenbach are concerned only with the prevention of theft of the vehicle.

Safety devices for automobile push button locks to provide some measure of protection against tampering by children are also known to the art. Budoff U.S. Pat. No. 2,793,064 discloses a device designed for safety purposes which may provide some measure of protection against theft. However this device is cumbersome and is not readily operable by authorized personnel. Martin U.S. Pat. No. 3,247,691 relates to a safety device which renders the push buttons selectively inaccessible for unlocking without tools, or accessible for ready locking and unlocking, at the choice of the operator of the vehicle. In the depressed condition the push buttons can only be raised by means of insertion of a narrow instrument through a slot in the barrel to engage under an appropriate raising lip on the push button guard. Van Hook U.S. Pat. No. 3,109,900 teaches a tubular guard of adjustable length designed particularly to keep the fingers of children away from an actuating mechanism. The device is open on top with a cross bar across the diameter to further guard against a child's hand being inserted. The Martin and Van Hook devices are rather complicated in design.

SUMMARY OF THE DISCLOSURE

These and other disadvantages of the prior art are solved by the instant invention which provides a relatively simple and inexpensive protector device to prevent tampering with the push button of the vehicle door lock from outside the vehicle by unauthorized personnel, and which also provides for the safety of child passengers by thwarting their access to the push button from within the vehicle. The protector device comprises a housing which is made of rigid material to prevent access to the push button by unauthorized personnel. In one embodiment of the invention, an access opening is defined by the housing to enable operation of the push button from within the vehicle. In another embodiment of the invention, a door is associated with the housing, the door having latching means associated therewith to enable the door to be opened by an adult but to thwart opening of the door by a child passenger. In this manner access to the push button by operation of the housing door is substantially limited to adults.

DETAILED DESCRIPTION OF THE INVENTION

Figure 1:
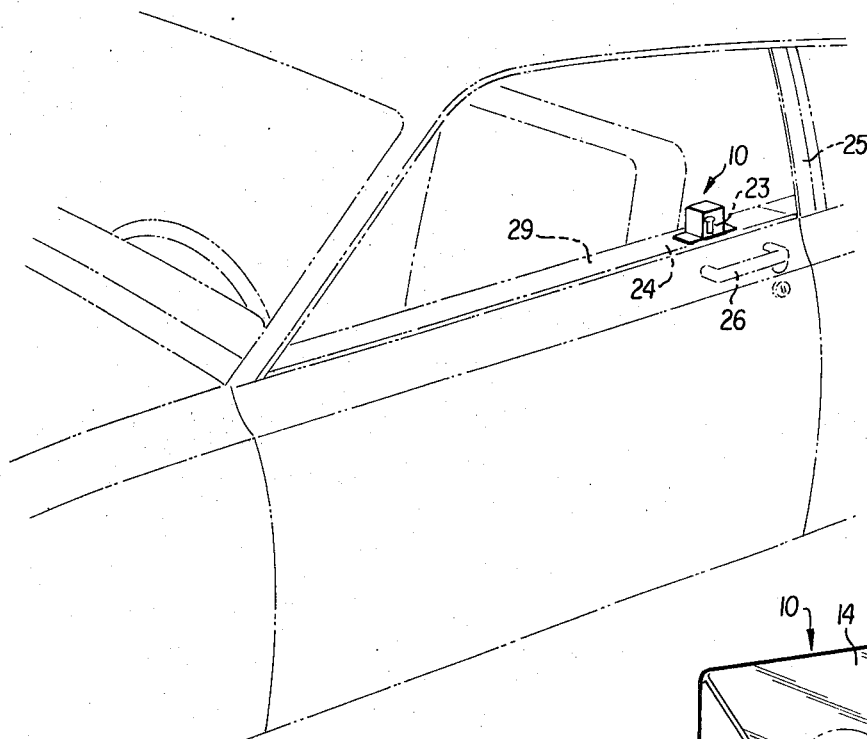
FIG. 1 is a cross-sectional view illustrating the positioning of the housing over the push button of the vehicle door lock and shows the mounting of the housing on the door frame of a vehicle.

FIG. 1 shows the push button lock protector device 10 according to the invention mounted on the window sill portion 29 of automobile door frame 24. The protector device is shown in greater detail in FIG. 2 as comprising a hollow and essentially rectangular housing having rigid side portions 11, 12 and 13 and top portion 14. Ends 15 and 16 of side portions 11 and 13, respectively, and end 17 of top portion 14 define rectangular access opening 18 with the door frame 25 when protector device 10 is mounted thereon. The housing further comprises extensions 19 and 20 respectively comprising flanged sections extending from sides 11 and 13. Extensions 19 and 21 define small diameter holes 21 and 22 respectively.

Automobile door lock push button 23 is of the conventional type which in depressed condition causes the automobile door to lock and in raised condition causes the automobile door to be unlocked. In FIG. 1, the push button 23 is in its raised condition wherein the automobile door is unlocked. The height of housing 10 is selected to enable manual operation of push button 23 through access opening 18. The housing 10 is of sufficient size to completely enclose push button 23 with the exception of access opening 18.

Figure 3:
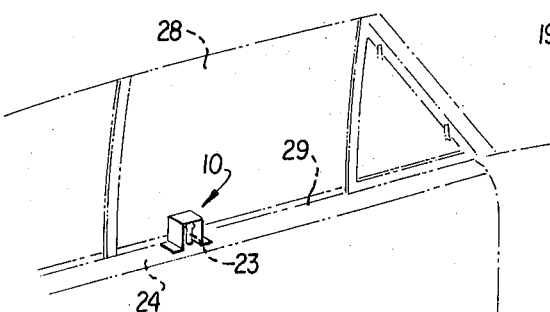
FIG. 3 is a perspective view showing the relative positioning of the housing over the push button, as well as its relative location with respect to the window and the door frame of the vehicle.

FIG. 1 shows in cross section the relevant positions of housing 10, push button 23 and door frame 24. The metal support post 25 and door handle 26 are also illustrated. Screws 27 and 27' respectively fixedly secure housing 10 flush to the window sill portion 29 of door frame 24. The relative positioning of window 28, push button 23, housing 10, and door frame 24, with housing 10 being fixed to door frame 24, is shown in FIG. 3. Access opening 18 is located in a plane which is substantially parallel to the plane of window 28. Under these conditions, access to push button 23 is only possible through access opening 18. This functions to thwart manipulation of the push button by unauthorized personnel outside the automobile by insertion of a wire or other type of burglar device between the windows of the automobile. Thus push button 23 will be inaccessible from the top because of rigid top portion 14, or from the side because of rigid side portion 12 adjacent to the window, or from the sides blocked by rigid portions 11 and 13. Further, it would be extremely difficult to manipulate a wire or other type of device from the outside into access opening 18 to raise the push button to unlock the door from the outside. Consequently the device according to the invention provides a relatively simple but yet extremely effective means of preventing theft of the automobile or its contents by unauthorized persons.

Figure 2:
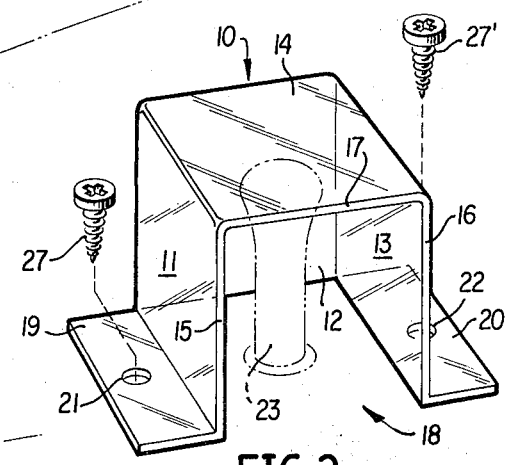
FIG. 2 is a perspective view showing the housing positioned over the push button.
Figure 4:
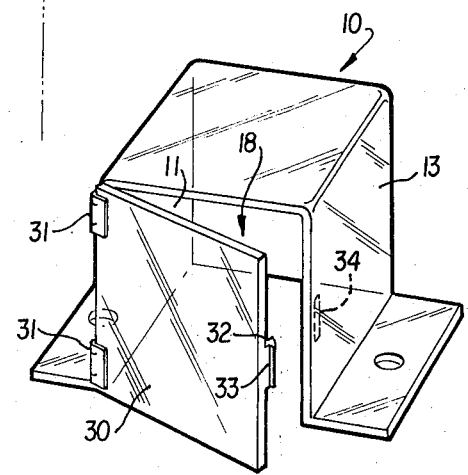
FIG. 4 is a perspective view showing an embodiment of the invention wherein the housing has a door associated therewith.

A further embodiment of the invention is shown in FIG. 4 of the drawings wherein housing 10 is similar to that shown and described with reference to FIG. 2 with the exception that a door 30 is secured by hinge means 31 to the edge of side portion 11. The door 30 selectively opens and closes access opening 18. The hinge means 31 may have conventional spring biasing means which maintain the door in a normally closed position but which may be opened by manual pressure. Further, in order to prevent unlocking of the door by unauthorized persons from within the automobile, such as children, the spring bias means may be made sufficiently strong to enable opening thereof only by one having sufficient strength, that is, by an adult. A further safety device may include a housing door latch consisting of section 32 extending from housing door 30 which defines groove 33 which interlocks with raised portion 34 defined by side portion 13 when the housing door is closed. The housing door latch should be relatively tight such that it can be opened with ease by an adult but only with great difficulty or not at all by a child. This type of housing door latch and the spring bias means are conventional in the art and are therefore not described in detail herein.

The protector device according to the invention thus provides a relatively simple and inexpensive housing which prevents tampering by unauthorized personnel from outside the car when the car is locked and the window is closed, and which further provides for access thereto by authorized personnel within the vehicle to enable operation of the push button to the desired position. It prevents access to the push button by a child within the vehicle through the use of the housing door latch features described above. Additional convenience and safety may be attained by positioning the housing door latch to be most accessible to the driver and least accessible to a child passenger.

The invention is not to be considered as limited to the particular rectangular housing configuration shown in the drawings and described in the specification as other shape housings may alternatively be employed. The housing may comprise any rigid material such as plastic, metal and the like.

What is claimed is:

1. A protector device for use with an automobile door lock push button of the type which projects upwardly from the automobile door frame at the window sill for the door window and which is raised to unlock the door and lowered to lock the door, comprising:

a rigid housing positioned onto the door frame and completely enclosing the push button except for an access opening defined by the rigid housing and the door frame facing the interior of the automobile in a plane substantially parallel to the plane of the window, means to securely mount the rigid housing to the door frame, access to the push button thereby being possible only through said access opening to thwart tampering therewith from the outside of the automobile when the window is closed and the door is locked, housing door means connected to the rigid housing, the housing door means being selectively operable to provide access to the access opening in its open position and to close the access opening in its closed position, means to latch the housing door means in its closed position to cut off access to the push button, spring bias means connecting the housing door means to the rigid housing, said spring bias means being sufficiently biased to normally maintain the housing door means in a closed position and which requires the strength normally inherent in an adult to operate the housing door means to the open position, to thwart operation thereof by a child.

2. The protector device recited in claim 1 wherein the latch means consists of interfitting elements on the housing door means and the rigid housing to latch the housing door means in the closed position, and which requires strength normally inherent in an adult to unlatch the latch, to thwart operation thereof by a child.

3. The protector device recited in claim 2 wherein the latch means are located to be most accessible to the driver relative to passengers riding in the back of the automobile.

* * * * *